Figure 1B:
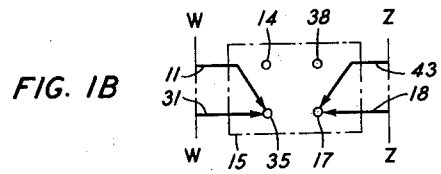

Oct. 29, 1957     A. L. BONNER     2,811,589
COAXIAL SWITCHING ARRANGEMENT FOR TWO WAY AMPLIFIERS
Filed March 18, 1954

INVENTOR
A. L. BONNER
BY Patrick J. Roche
ATTORNEY

United States Patent Office 2,811,589
Patented Oct. 29, 1957

2,811,589

COAXIAL SWITCHING ARRANGEMENT FOR TWO WAY AMPLIFIERS

Arthur L. Bonner, Chatham, N. J., assignor to Bell Telephone Laboratories, Incorporated, New York, N. Y., a corporation of New York Application March 18, 1954, Serial No. 417,013

19 Claims. (Cl. 179—170)

This invention relates to coaxial conductors for communication purposes, and more specifically to an arrangement for minimizing interference effects between such coaxial conductors.

Carrier telephone systems have been heretofore developed for short-haul use on open-wires and cables extending in length up to approximately 200 miles. Such systems comprise terminal and line equipments which include similar and/or common system components or subassemblies comprising channel units, high or low group transmitting units, high or low group receiving units, high-low or low-high repeaters, oscillator or filter units. The systems are inexpensive in an economical sense in regard to purchase, installation and maintenance costs. As a consequence, the overall terminal and line equipments are compact from a bulk standpoint and involve components which are light in weight and compact in size so as to lend themselves expeditiously for mounting in the terminals on a plug-in basis, as well as for the facile handling thereof by operating personnel. In view of the foregoing, as well as the fact that many components perform at least one complete electrical function, the components can be handled individually for maintenance and repair purposes. Maintenance on the overall carrier systems and the components thereof is not contemplated for performance in the field but at servicing centers which are centrally located relative to the terminals of particular systems. When trouble develops in the system in such manner as to indicate impairment of one or more specific components, or the need for an adjustment thereof, the faulty component is removed immediately from the circuit and replaced at once with a substitute which is in proper working condition. Thereafter, the faulty component is sent to a servicing center at which suitable testing facilities and adequately trained personnel are available to perform the necessary testing operations and repair work for re-conditioning the faulty component. In due course, the reconditioned component will be returned to the field for further service. The service center tends to maintain at the minimum the quantity of testing and repair facilities as well as the number of personnel required for effecting the necessary testing and repair operations.

Altogether about 30 different components may require testing and since some of them perform one or more circuit functions, it happens that approximately 70 different testing set-ups are required for maintaining each of the abovementioned carrier systems. In order to perform the testing operations expeditiously, it was found that the testing apparatus should be simple in operation in order to obviate the need for specially trained technical personnel and at the same time to enable all testing set-ups to be performed at the same test bench. As a consequence, some testing components and circuit portions used in the several different testing operations are found to be subject to certain undesirable electrical interferences whereby error is introduced into the particular electrical measurement involved. As one example of such interference, it was noted that the measurement of gain in the E-W and W-E carrier amplifiers involved the use of a single jack into which the respective amplifiers were plugged in the same physical sense irrespective of their particular direction of transmission, as well as the use of several coaxial conductors of which some had their inner conductors switched from the input of an E-W amplifier to the output of a W-E amplifier and vice versa depending on the direction of transmission of the particular amplifier under test. In such test set-up a ground return path including the outer conductors of the several coaxial conductors comprised connections strapped around the particular switching contacts involved in the test set-up. As a consequence, it was found that while a desired path for the ground return current was effected in the particular test set-up, it was also found that there was a second but undesired path for the ground return current. The undesired ground return path included an outer conductor of one coaxial conductor connected in the output of the amplifier under test, i. e., the high signal level portion of the circuit, and an outer conductor of a second coaxial conductor connected in the amplifier input, i. e., the low signal portion level of the circuit. Since the outer conductors in the undesired second ground return path possessed some resistance, it was apparent that such resistance was common to the high and low level portions of the testing circuit. Accordingly, such common resistance tended to develop a crosstalk or feedback voltage effective from the amplifier output to the amplifier input thereby tending to cause the amplifier under test to sing. Obviously such crosstalk tends to introduce error into the testing measurements. It was also found that capacitances between the coaxial cables connected in the high and low signal level portions of the testing circuit tended to introduce further crosstalk voltage thereinto whereby the first-mentioned crosstalk voltage was augmented to increase further the crosstalk sing condition in the amplifier under test.

The present invention contemplates an arrangement for providing substantially a common ground in a path for the return current in a coaxial conductor communication system comprising a plurality of discrete coaxial conductors in such manner as to tend to minimize the introduction therein of interfering voltages as the sequence of the interconnection of the inner conductors is changed from time to time.

One object of the invention is to provide a plurality of coaxial conductors for communication purposes in such manner that the coaxial conductors are substantially free from crosstalk interference.

Another object is to permit changes in the interconnections of the inner conductors of a plurality of coaxial conductors while at the same time tending to minimize interference effects therebetween.

A further object is to obviate ground return connections around contacts in a switching arrangement for varying the interconnections of the inner conductors of a plurality of coaxial conductors.

Another object is to provide substantially a common ground point in a ground return path in a circuit requiring a changing of the interconnections of the inner conductors of a plurality of coaxial conductors.

Still another object is to minimize the effect of the capacitances between discrete coaxial conductors in a plurality of coaxial conductors for communication purposes.

Figure 1:
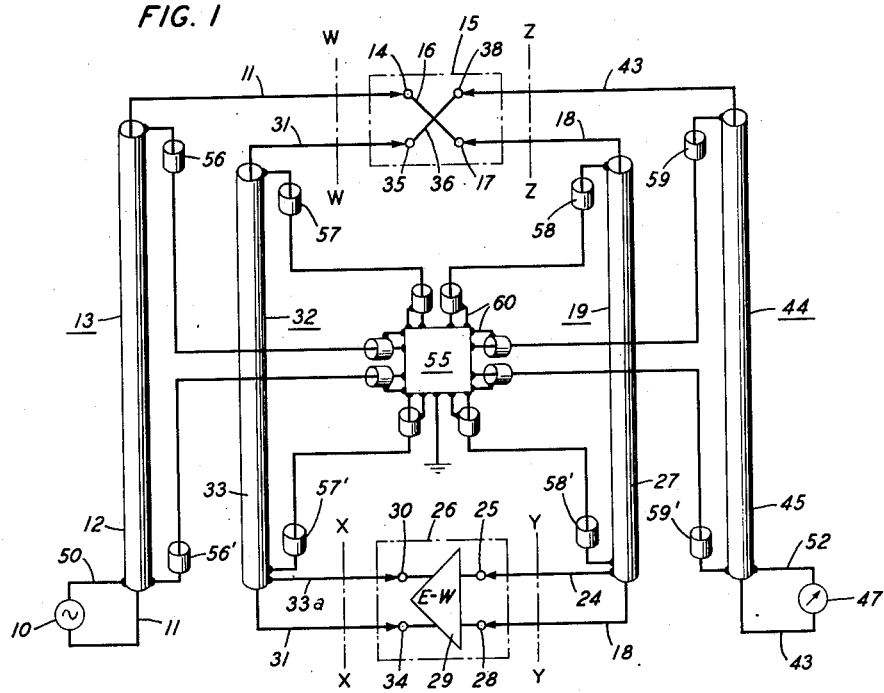
Figure 1A:
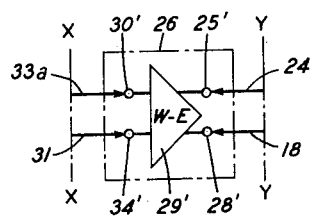

These and other objects of the invention will be readily understood from the following description taken together with the accompanying drawing in which:

Fig. 1 is a schematic circuit illustrating a specific embodiment of the invention; and Figs. 1A and 1B are fragmentary schematic circuits which can be substituted in Fig. 1.

The present invention, utilized with a plurality of coaxial conductors for communication purposes and a switching mechanism for changing the interconnection of the inner conductors of the coaxial conductors, comprises a common ground bus bar, a plurality of shielded wires for connecting the opposite ends of the outer conductor of each coaxial conductor to the common ground bus bar, and leads for connecting one end of the shield of each shielded wire to the common ground bus bar.

A feature of the invention resides in a common bus bar which constitutes substantially a common ground point in the ground return path of a plurality of coaxial conductors whereby interference effects due to crosstalk are substantially minimized.

Another feature involves a common ground bus bar for short circuiting capacitances between coaxial conductors.

A further feature relates to a common ground bus bar for tying ground return paths around contacts included in a switching mechanism for changing the sequence of the interconnection of the inner conductors of a plurality of coaxial conductors whereby the ground bar and return paths remain with the respective coaxial conductors for all changes of the sequential inter-connection of the inner conductors.

Still another feature relates to a common ground for eliminating singing in amplifiers connected one at a time in a testing circuit by means of a plurality of coaxial conductors.

Still another feature involves an equipotential barrier established between shielded wires connecting to a common ground the opposite ends of each outer conductor of a plurality of coaxial conductors.

Referring to Fig. 1, a source 10 of an alternating current test signal having a frequency in the range from 50 kc. up to 600 kc., for example, is connected to inner conductor 11 and outer conductor 12 at one end of a coaxial conductor 13. The opposite end of inner conductor 11 is connected to contact 14 included in a multi-contact switching device 15. While the latter shows only a few of the many contacts included in a complete switching device, not shown, it will be understood that the few contacts shown here are for descriptive purposes. Contact 14 is joined by switching contact 16 to contact 17 in the switching device. The latter contact is also connected to one end of inner conductor 18 of coaxial conductor 19. At the opposite end of the latter, its inner conductor 18 is connected to terminal 28 of a multi-terminal jack 26 while its outer conductor 27 is joined via lead 24 to jack 25. Thus, jack terminals 25 and 28 are interposed in the input of E-W amplifier 29 under test in Fig. 1. Jack terminal 34 is joined to a near end of inner conductor 31 of a coaxial conductor 32 which has the near end of its outer conductor 33 joined by lead 33a to jack terminal 30. Thus, jack terminals 30 and 34 are interposed in the output of the E-W amplifier under test. Coaxial conductor 32 has the opposite end of its inner conductor 31 connected to switching contact 35 which is joined via connection 36 to the near end of inner conductor 43 of coaxial conductor 44 which at its opposite end has its inner conductor 43 connected to a suitable signal indicator 47 and also its outer conductor 45 connected thereto via lead 52.

It will be understood that W-E amplifier 29′ in Fig. 1A can be connected in circuit in Fig. 1 by removing the E-W amplifier 29 from jack 26, and then substituting the former amplifier therefor. This is indicated by the circuit portions included between the lines X—X and Y—Y in Figs. 1 and 1A. Referring to Figs. 1 and 1A, it will be apparent that the E-W and W-E amplifiers have corresponding terminals whereby each can be expeditiously inserted into and removed from jack 26 one at a time for test purposes. Hence, it will be seen that when the W-E amplifier 29′ in Fig. 1A is inserted in jack 25 and thereby connected in the circuit of Fig. 1, terminals 25′ and 28′ are interposed in the amplifier output while terminals 30′ and 34′ are interposed in the amplifier input. Thus, the input and output terminals of the W-E amplifier 29′ in jack 26 are interchanged relative to the corresponding terminals of the E-W amplifier 29 in jack 26 in Fig. 1 as previously explained. In this respect, it will be understood that jack 26 represents one of several jacks included in the overall testing equipment, and that the jack terminals are provided with predetermined configurations in order to accommodate corresponding terminals on the amplifiers irrespective of whether the amplifier terminals represent the amplifier input or output. This is done for the purpose of simplifying the overall test circuit and procedure.

In view of the abovenoted interchange of the input and output terminals of the respective E-W and W-E amplifiers in jack 26, it is necessary to modify the connections of the signal source and indicator in the switching device 15. This is achieved with the circuit connections illustrated in Fig. 1B. Accordingly, it will be clear from the latter figure that when the W-E amplifier per Fig. 1A is connected in circuit in Fig. 1, then the switching device 15 per Fig. 1 is modified as shown in Fig. 1B. From this, it is seen that inner conductor 11 of coaxial conductor 13 is disengaged from switching contact 14 and connected to switching contact 35 to which the connection of inner conductor 31 of coaxial conductor 32 remains. At the same time, inner conductor 43 of coaxial conductor 44 is disengaged from the switching contact 38 and joined to switching contact 17 to which is also connected the inner conductor 18 of coaxial conductor 19. From the foregoing, it will be evident that only the inner conductors 11 and 43 of coaxial conductors 13 and 44, respectively, are switched by adjustment of switching device 25 in order to transfer the signal source and indicator from the input and output, respectively, of the E-W amplifier to the input and output, respectively, of the W-E amplifier.

The circuit Fig. 1 as above-described can be arranged to measure an electrical characteristic of the E-W amplifier and the circuit of Fig. 1 as modified to include the circuitry of Figs. 1A and 1B is arranged to measure a similar characteristic of the W-E amplifier, in a manner which will now be explained.

In accordance with the present invention, a common ground return path is provided for the signal source, indicator and coaxial conductors in a manner which will now be explained. In the first instance it will be noted in Fig. 1 that the ground return path for the signal source 10 is connected by lead 50 to outer conductor 12 of coaxial conductor 13 which also has its inner conductor 11 connected to the signal source; and that the ground return for the indicator 47 is connected by lead 52 to outer conductor 45 of coaxial conductor 44 which also has its inner conductor 43 connected to the indicator. Further, it will be recalled that input ground terminal 25 of E-W amplifier 29 is connected via lead 24 to outer conductor 27 of coaxial conductor 19 while output ground terminal 30 of the same amplifier is connected by lead 33a to outer conductor 33 of coaxial conductor 32 as hereinbefore mentioned.

Also in Fig. 1 as modified to include Figs. 1A and 1B, the ground return path on the signal source and indicator remains the same but now the W-E amplifier has its input ground return terminal 30′ connected via lead 33a to outer conductor 33 of coaxial conductor 32 and output ground terminal 25′ connected by lead 24 to the outer conductor 27 of coaxial conductor 19. As previously indicated, it will be apparent that the coaxial conductors 19 and 32 are connected in the input and output, respectively, of the E-W amplifier, i. e., the low signal level and high signal level, respectively; that the coaxial conductors 32 and 19 are connected in the input and output, respectively, of the W-E amplifier, i. e., the low signal level and high signal level, respectively; and that the interchange of those coaxial conductors in the foregoing respect is achieved merely by the substitution of one amplifier for the other in jack 26 coupled with appropriate adjustments of the switching device 15 as indicated in Figs. 1 and 1B. Thus, it will be apparent that the testing circuit may be conditioned to measure an electrical characteristic of the E–W or W–E amplifier by manipulating device 15 to effect the necessary changes in the interconnections of the inner conductors of the several coaxial conductors as previously pointed out.

A common ground bus bar 55 is connected via shielded wires 56 and 56' to the opposite ends of outer conductor 12 of coaxial conductor 13; via shielded wires 57 and 57' to the opposite ends of outer conductor 33 of coaxial conductor 32; via shielded wires 58 and 58' to the opposite ends of outer conductor 27 of coaxial conductor 19; and via shielded wires 59 and 59' to the opposite ends of outer conductor 45 of coaxial conductor 44. Also, the end of each shield of all shielded wires is connected to the common ground bus bar via one of a plurality of leads 60. This provides substantially a common ground point and thereby a common path for the ground return current of the signal service, indicator and several sections of coaxial conductor utilized in the measuring system shown in the drawing, as further indicated below. Thus, it is apparent that the same ground return path for each coaxial conductor remains with it as the inner conductors of the respective coaxial conductors are switched from the input of one amplifier under test to the output of another or vice versa.

As one example of practicing the invention shown in the drawing, the common bus bar comprised a copper bar approximately 2½ inches long, ⅝ inch wide and ¹⁄₁₆ inch thick; and was provided with at least 14 pairs of holes each hole being approximately ¹⁄₁₆ inch in diameter, the center lines of adjacent holes being spaced about ³⁄₁₆ inch apart. Also, each hole contained from one to four wires comprising the shielded wires and/or the wires 60.

Further in practicing the invention shown in the drawing, it was found that crosstalk between the coaxial conductors connected in the input and output of a particular amplifier under test could be maintained to a loss of approximately 90 decibels by bringing all leads involved in the particular measurement to a preselected area of about ¾ inch in diameter on the surface of the common ground bus bar for an operating frequency of 200 kilocycles to 300 kilocycles. As such crosstalk requirements became less stringent, the leads involved in the particular measurement were spread out in regard to the surface area of their attachment to the common ground bus bar. In the latter, a crosstalk limitation of approximately 75 decibels permitted the ground leads involved in the particular measurement to be spread out to an area of about 1½ inches in diameter on the surface of the common ground bus bar for an operating frequency of 200 kilocycles to 300 kilocycles.

In order to reduce a congestion of the ground leads attached to the surface of the common ground bus bar, it will be understood that such ground leads as are not closely involved in measurements requiring high crosstalk loss can be connected to the common ground bus bar in an area which is remote from the area to which the ground leads involved in the high crosstalk requirement are connected for a given operating frequency. In other words, ground leads between which crosstalk is not a problem can be spread out on the surface of the ground bus bar in an area remote from the area to which the leads involved in the high order crosstalk loss can be connected at the given operating frequency.

In view of the fact that all ground leads involved in particular crosstalk losses, say for example the 90 decibel loss, are brought substantially to one point on the common ground bus bar and since such point contains substantially no effective resistance, the introduction of a common impedance and thereby a crosstalk voltage between the coaxial conductors connected in the input and output of the amplifier under test tends to be eliminated or at least substantially minimized. Obviously, this would also tend to eliminate the introduction of singing in the amplifier under test.

As all ground return current is transmitted through the ground return leads shown in Fig. 1, the shields on the ground leads tend to maintain a high crosstalk loss of the order of 90 decibels between the ground return leads connected in the input and output of the particular amplifier under test, due to the fact that only the shield ends adjacent to the common ground bus bar are also connected thereto. Since the shields on the ground leads do not transmit current normally effective in the circuit because of the single ground connection thereto, such shields tend to constitute an equipotential barrier between the ground leads and to drain back to the common ground bus bar such crosstalk current as tends to be effective between the shields. The shields on the ground wires also tend to provide increased electrical separation, i. e., reduced electrical coupling, between the ground leads and thereby to reduce electromagnetic coupling therebetween.

An additional effect of the connection of the common ground bus bar to the opposite ends of each coaxial conductor shown in the drawing is that the shielded ground leads tend to shorten out capacitances between coaxial conductors connected in the input and output of the particular amplifier under test and thereby to reduce crosstalk arising from such capacitances. It was found to be substantially more effective in the foregoing respect to tie both ends of each coaxial conductor, rather than just one end thereof, to the common ground bus bar for the reason probably that certain shielded ground leads tend to carry most of the ground return current rather than the outer conductors of the respective coaxial conductors. Also it is likely that the connection of the shielded ground leads to the opposite ends of the outer conductors of the coaxial conductors tend to minimize the effect of any voltage developed across those conductors.

While the invention has been described above as applied to a circuit for measuring a characteristic of an amplifier, it will be understood that the invention may also be utilized to minimize the effect of interference due to currents which occur in other types of communication systems. Accordingly, it will be further understood that modifications within the scope of the invention herein discussed will occur to those skilled in the art, and that the disclosure hereinbefore is intended to be illustrative but not limiting.

What is claimed is:

1. In combination, signaling amplifying means having two pairs of terminals interchangeably selective for one of two opposite directions of signaling transmission at a given time, one terminal of each pair constituting a ground return, a plurality of discrete conductor pairs, the conductors of each pair being insulated from each other, one conductor of each pair forming a ground return and being connected to one of said return ground terminals, an end of a second conductor of each of said conductor pairs being connected to a second terminal of each of said terminal pairs, switching means for so interchanging connections at other ends of said second conductors in response to the selection of said amplifying terminal pairs for one of the two opposite directions of signaling transmission that the respective conductor pairs may be effectively interchangeably connected to the last-mentioned selected amplifying terminal pairs in the input or output of said amplifying means, and means to establish for each of said one conductors a ground return path which remains therewith regardless of whether the respective conductor pairs are effectively connected to selected amplifying terminal pairs in the input or output of said amplifying means for the selected one direction of signaling transmission, comprising a common ground bus bar, and means for connecting the opposite ends of said one conductors to an area of preselected size on a surface of said ground bus bar.

2. The combination according to claim 1 which includes electrical shielding means for said last-mentioned connecting means, and means for connecting said area of preselected size on said surface of said ground bus bar to the nearest ends of said shielding means thereby effectively establishing said shielding means as equipotential barriers between said first-mentioned connecting means and said ground bus bar.

3. The combination according to claim 1 in which said last-mentioned connecting means comprises a plurality of pairs of shielded wires, each of said wire pairs connecting the opposite ends of each of said one conductors to said area of preselected size on said surface of said ground bus bar, and means for connecting said area of preselected size on said surface of said ground bus bar to the nearest ends of the shelds on said wires, said area of preselected size on said surface of said ground bar together with the connection thereto of said last-mentioned wires and shields substantially minimizing interfering electrical effects passing between said conductor pairs.

4. The combination according to claim 1 in which said amplifying terminals are initially selected for one direction of signaling transmission whereby a first terminal pair constitutes the input terminals and a second terminal pair forms the output terminals of said amplifying means, said switching means effectively connecting at least one conductor pair to said first terminal pair and at least a second conductor pair to said second terminal pair, said amplifying terminals being further selected for an opposite direction of signaling transmission whereby said first terminal pair now constitutes the output terminals and said second terminal pair forms the input terminals of said amplifying means, said switching means further effectively connecting said one conductor pair to said last-mentioned first terminal pair and said second conductor pair to said last-mentioned second terminal pair, said switching means thus changing the sequence of connection of said one and second conductor pairs in circuit with said amplifying means upon the selection of said amplifying terminal pairs for both of the two opposite directions of signaling transmission, and said ground path remaining with each of said one conductors of said one and second conductor pairs regardless of the sequence of connection of the respective conductor pairs in circuit with said amplifying means.

5. The combination according to claim 1 in which said last-mentioned connecting means connects the opposite ends of said one conductors to one of at least two areas preselected in different sizes and spaced from each other on a surface of said ground bus bar for maintaining one of two different magnitudes of crosstalk loss between said conductor pairs, said last-mentioned connecting means being connected to the smaller preselected ground bar area for maintaining the larger magnitude of crosstalk loss or to the larger preselected ground bar area for maintaining the smaller magnitude of crosstalk loss.

6. In a signaling system, a source of signals, a load, amplifying means having two pairs of terminals interchangeably selective for one of two opposite directions of signaling transmission at a given time, one terminal of each pair constituting a ground return, a plurality of discrete conductor pairs, the conductors of each pair being insulated from each other, one conductor of each pair forming a ground return, said one conductors of first and second conductor pairs of said plurality of conductor pairs being connected to said ground return terminals, certain ends of second conductors of said first and second conductor pairs being connected to second terminals of said terminal pairs, third and fourth conductor pairs of said plurality of said conductor pairs having certain ends connected to said signal source and load respectively, switching means for interchanging connections at other ends of second conductors of said first, second, third and fourth conductor pairs upon the selection of said amplifying terminal pairs for one of the two opposite directions of signaling transmission whereby the respective conductor pairs may be effectively interchangeably connected to said last-mentioned selected amplifying terminal pairs in the input or output of said amplifying means, and means to establish for each of said one conductors of said first, second, third and fourth conductor pairs a ground return path which remains with each of said one conductors regardless of whether the respective conductor pairs are effectively connected to selected amplifying terminal pairs in the input or output of said amplifying means for the selected one direction of signaling transmission, comprising a common ground bus bar, and means for connecting a surface of said bus bar to opposite ends of said one conductors of said first, second, third and fourth conductor pairs.

7. The signaling system according to claim 6 in which said last-mentioned connecting means connects the opposite ends of said one conductors of said first, second, third and fourth conductor pairs to an area of preselected size on said surface of said ground bus bar whereby crosstalk between said last-mentioned conductor pairs is substantially minimized.

8. The signaling system according to claim 6 in which said last-mentioned connecting means comprises a plurality of wires for connecting the opposite ends of said one conductors to at least two areas preselected in different sizes and spaced from each other on said surface of said ground bus bar for maintaining at least two different effective magnitudes of crosstalk loss between said conductor pairs, said plurality of wires being associated in at least two groups, one of said wire groups being connected to the smaller of said preselected ground bar areas for maintaining the larger magnitude of crosstalk loss between the conductor pairs to which said one wire group is connected, and a second of said wire groups being connected to the larger of said preselected ground bar areas for maintaining the smaller magnitude of crosstalk loss between the conductor pairs to which said second wire group is connected.

9. An electrical circuit for signaling communication including amplifying means having two pairs of terminals interchangeably selective for one of two opposite directions of signaling communication at a given time, one terminal of each of said terminal pairs being a ground return, a plurality of discrete coaxial conductors each comprising an inner conductor and an outer conductor, said outer conductors forming a ground return and being connected to said ground return terminals, said inner conductors having certain ends effectively connected to second terminals of said terminal pairs, switching means for interchanging connections at other ends of said inner conductors to change the sequence of connection of said inner conductors in circuit with said last-mentioned second terminals upon the selection of said amplifying terminal pairs for one of the two opposite directions of signaling communication whereby the respective coaxial conductors are effectively interchangeably connected to said last-mentioned selected amplifying terminal pairs in the input or output of said amplifying means, and means to establish for each of said outer conductors a ground return path which remains therewith regardless of the sequence of connection of the associated inner conductors in circuit with said last-mentioned second terminals for effectively connecting the respective coaxial conductors in the input or output of said amplifying means, comprising a ground bus bar, a plurality of pairs of shielded wires, each of said shielded wire pairs connecting an area of preselected size on a surface of said ground bar to opposite ends of one of said outer conductors, and a plurality of electrical leads, each of said leads connecting said area of preselected size on said surface of said ground bar to the nearest end of the shield on one of said wires, said area of preselected size on said surface of said ground bar in association with said shielded wires and said leads connected thereto substantially minimizing crosstalk effects between said coaxial conductors regardless of whether the sequence of connection of said last-mentioned inner conductors in circuit with said last-mentioned second terminals connects the respective coaxial conductors in the input or output of said amplifying means for either one of the two directions of signaling communications.

10. The electrical circuit according to claim 9 in which said amplifying means has its terminal pairs initially selected for east-west signaling communication whereby a first terminal pair and a second terminal pair are connected in its input and output respectively, said switching means initially connecting the inner conductors of at least two coaxial conductors in one sequence in circuit with said amplifying means in such manner that the inner conductor of one of said last-mentioned coaxial conductors is connected to a second terminal of said first terminal pair and the inner conductor of a second of said last-mentioned coaxial conductors is connected to a second terminal of said second terminal pair, said amplifying means having its terminal pairs further selected for west-east signaling communication whereby said first and second terminal pairs are connected to its output and input respectively, said switching means further connecting said inner conductors of said last-mentioned two coaxial conductors in a different sequence in circuit with said amplifying means in such manner that the inner conductor of said last-mentioned one coaxial conductor is connected to said second terminal of said last-mentioned first terminal pair and the inner conductor of said last-mentioned second coaxial conductor is connected to said second terminal of said last-mentioned second terminal pair, said ground return path for each of said outer conductors remaining therewith regardless of whether the respective coaxial conductors are effectively connected in said one or different sequence in circuit with said amplifying means.

11. An electrical circuit for communication purposes including amplifying means having two pairs of terminals interchangeably selective for one of two opposite directions of signaling transmission at a given time, one terminal of each of said terminal pairs being a ground return, at least two discrete coaxial conductors each comprising an inner conductor spaced from an outer conductor, said outer conductors forming a ground return and being connected to said ground return terminals, said inner conductors having certain ends connected to second terminals of said terminal pairs, switching means for interchanging connections at other ends of said last-mentioned inner conductors in response to the selection of amplifying terminal pairs for one of the two opposite directions of signaling transmission whereby the respective coaxial conductors are effectively interchangeably connected to said last-mentioned selected amplifying terminal pairs in the input or output of said amplifying means, and means to establish for each of said outer conductors a ground return path which remains therewith regardless of whether respective coaxial conductors are effectively connected to selected amplifying terminal pairs in the input or output of said amplifying means for the selected one direction of signaling transmission, comprising a ground bus bar, a plurality of wires each having a metallic shield, said wires connecting said ground bar to opposite ends of said outer conductors, and a plurality of electrical leads connecting said ground bar to the nearest ends of said shields, said wires and associated leads being connected to an area of preselected size on a surface of said ground bar for substantially minimizing interfering electrical effects passing between said coaxial conductors.

12. In a signaling circuit, amplifying means having two pairs of terminals interchangeably selective for one of two opposite directions of signaling transmission at a given time, one terminal of each of said terminal pairs being a ground return, at least two discrete coaxial conductors each comprising an inner conductor spaced from an outer conductor, said outer conductors forming a ground return and being connected to said ground return terminals, said inner conductors having certain ends connected to second terminals of said terminal pairs, switching means for interchanging connections at other ends of said last-mentioned inner conductors upon selection of amplifying terminal pairs for one of the two opposite directions of signaling transmission whereby the respective coaxial conductors are effectively interchangeably connected to said last-mentioned selected amplifying terminal pairs in the input or output of said amplifying means, and means to establish for each of said outer conductors a ground return path which remains therewith regardless of whether the respective coaxial conductors are connected to selected amplifying terminal pairs in the input or output of said amplifying means for the selected one direction of signaling transmission, comprising a ground bus bar, and means for connecting the opposite ends of said outer conductors to a surface of said ground bus bar.

13. In a signaling circuit, a source of signals, a load, amplifying means having two pairs of terminals selectively interchangeable for one of two different directions of signaling transmission at a given time, one terminal of each pair being a ground return, a plurality of discrete coaxial conductors each comprising an inner conductor spaced from an outer conductor, said outer conductors forming a ground return, outer conductors of first and second coaxial conductors of said plurality of coaxial conductors being connected to said amplifying ground return terminals, inner conductors of said last-mentioned first and second coaxial conductors having certain ends connected to second terminals of said amplifying terminal pairs, third and fourth coaxial conductors of said plurality of said coaxial conductors, said last-mentioned third coaxial conductor having a certain end connected to said signal source, said last-mentioned fourth coaxial conductor having a certain end connected to said load, switching means for interchanging connections at other ends of said inner conductors of first, second, third and fourth coaxial conductors in response to the selection of amplifying terminal pairs for given directions of signaling transmission whereby the respective coaxial conductors are effectively interchangeably connected to said last-mentioned selected amplifying terminal pairs in the input or output of said amplifying means, and means to establish for each of said outer conductors a ground return path which remains therewith regardless of whether the respective coaxial conductors are effectively connected to selected amplifying terminal pairs in the input or output of said amplifying means for the selected one direction of signaling transmission, comprising a ground bus bar, and means for connecting a surface of said ground bus bar to opposite ends of said outer conductors of the respective coaxial conductors.

14. The circuit according to claim 13 in which said last-mentioned connecting means comprises wires having metallic shields for connecting said ground bar surface to opposite ends of said outer conductors of the respective coaxial conductors, and electrical leads for connecting said ground bar surface to the nearest ends of said shields, said wires and shields being divided into at least two groups and connected to at least two areas preselected in different sizes and spaced from each other on said surface of said ground bar for providing at least two different magnitudes of crosstalk loss between the coaxial conductors whose outer conductors are connected to the respective preselected ground bar areas of different sizes, the coaxial conductors whose outer conductors are connected to the smaller preselected ground bar area having the higher magnitude of crosstalk loss therebetween, and the coaxial conductors whose outer conductors are connected to the larger preselected ground bar area having the smaller magnitude of crosstalk loss therebetween.

15. In a signaling circuit, a jack having two pairs of terminals each terminal pair having a shape different from that of the other pair, at least two amplifiers each including an input terminal pair and an output terminal pair, said amplifier terminal pairs having such shapes that the respective amplifier terminal pairs are accommodated in said jack terminal pairs only for one of two opposite directions of signaling transmission, one terminal of each amplifier pair being a ground return, a plurality of discrete coaxial conductors each including an inner conductor and an outer conductor constituting a ground return, said outer conductors being effectively connected by one terminal of each of said pack terminal pairs to said amplifier ground return terminals, certain ends of said inner conductors being effectively connected by another terminal of each of said jack terminal pairs to second terminals of said amplifier terminal pairs, switching means for so interconnecting other ends of said inner conductors upon the positioning of the respective amplifiers in said jack that the respective coaxial conductors are interchangeably connected to the input or output terminal pairs of the respective amplifiers, and means for substantially minimizing interference effects between said coaxial conductors regardless of whether the respective coaxial conductors are effectively connected to the input or output terminal pairs of the respective amplifiers, comprising a ground bus bar, and means for connecting the opposite ends of each of said outer conductors to an area of preselected size on a surface of said ground bar, said ground bar and last-mentioned connecting means constituting for each of said outer conductors a ground path which remains therewith regardless of whether the respective coaxial conductors are effectively connected to the input or output terminal pairs of the respective amplifiers.

16. In a signaling circuit, a source of signals, a load, at least two amplifiers each including a pair of input terminals and a pair of output terminals, each of said terminal pairs including a ground return, said output terminal pair of a first amplifier and said input terminal pair of a second amplifier having one preselected configuration and said input terminal pair of said first amplifier and said output terminal pair of said second amplifier having a different preselected configuration, a jack having at least two terminals for receiving only said amplifier terminal pairs of said one configuration and at least two terminals for receiving only said amplifier terminal pairs of said different configuration, one terminal of each of said jack terminals of said one and different configurations constituting a ground return connected to one of said amplifier ground return terminals, a plurality of pairs of conductors, the conductors of each pair being insulated from each other and each conductor pair including one conductor constituing a ground return, certain ends of a first conductor pair of said plurality of conductor pairs being connected to said jack terminals of said different configuration and certain ends of a second conductor pair of said plurality of conductor pairs being connected to said jack terminals of said one configuration in such manner that said one conductors of both said last-mentioned first and second conductor pairs are connected to said jack ground return terminals and thereby to said amplifier ground return terminals, a third conductor pair of said plurality of conductor pairs having certain ends of both said one conductor and a second conductor connected to said signal source, a fourth conductor pair of said plurality of conductor pairs having certain ends of both said one conductor and a second conductor connected to said load, adjustable switching means, said switching means being adjustable in response to a positioning of said first amplifier in said jack to connect other ends of second conductors of said first and third conductor pairs to said signal source and at the same time to connect other ends of second conductors of said second and fourth conductor pairs to said load, said switching means being also adjustable in response to a substitution of said second amplifier for said first amplifier in said jack to connect said other ends of said second conductors of said first and fourth conductor pairs to said load and at the same time to connect said other ends of said second conductors of said second and third conductor pairs to said signal source, said adjustments of said switching means effectively interchangeably connecting the respective conductor pairs to the input or output of said amplifiers, and means to establish for each of said one conductors a ground return path which remains therewith regardless of whether the respective conductor pairs are effectively connected to the input or output of said amplifiers, comprising a ground bus bar, and means for connecting the opposite ends of said one conductors to a surface of said ground bar.

17. The signaling circuit according to claim 16 in which said last-mentioned connecting means is connected to an area of preselected size on a surface of said ground bar for providing a preselected magnitude of crosstalk loss between the conductor pairs.

18. The signaling circuit according to claim 16 in which said last-mentioned means comprises shielded wires connecting the opposite ends of said one conductor to an area of preselected size on a surface of said ground bar, and means for connecting said last-mentioned preselected ground bar area to the nearest ends of said shields, said preselected ground bar area and connection of said wires and leads thereto substantially minimizing electrical interference effect due to crosstalk passing between said conductor pairs.

19. The signaling circuit according to claim 16 in which said last-mentioned connecting means is selectively connected to one of two areas preselected in different sizes and spaced from each other on a surface of said ground bar for maintaining two different magnitudes of crosstalk loss between the conductor pairs, said last-mentioned means being connected to the smaller preselected ground bar area to provide the larger magnitude of crosstalk loss or to the larger preselected area to provide the smaller magnitude of crosstalk loss.

References Cited in the file of this patent
UNITED STATES PATENTS 2,412,159    Leeds ---------------- Dec. 3, 1946